United States Patent [19]
Duncan

[11] Patent Number: 5,429,382
[45] Date of Patent: Jul. 4, 1995

[54] VEHICLE TOW BAR

[76] Inventor: Lee H. Duncan, 88806 Greenhill Rd., Eugene, Oreg. 97402

[21] Appl. No.: 253,635

[22] Filed: Jun. 3, 1994

[51] Int. Cl.6 .............................................. B60D 1/167
[52] U.S. Cl. .................................................. 280/491.4
[58] Field of Search ............... 280/491.1, 491.2, 491.3, 280/491.4

[56] References Cited

U.S. PATENT DOCUMENTS

| | | | |
|---|---|---|---|
| 4,861,061 | 8/1989 | Frantz | 280/491.4 |
| 5,071,153 | 12/1991 | Duncan | 280/491.4 |
| 5,356,166 | 10/1994 | Hahne et al. | 280/491.4 |

Primary Examiner—Mitchell J. Hill
Attorney, Agent, or Firm—Olson & Olson

[57] ABSTRACT

A vehicle tow bar includes a transverse cross member which mounts one pivotal, elongated leg assembly in fifth position at one end of the cross bar and a second pivotal, elongated leg assembly for movement across the cross bar between a collapsed condition closely adjacent the first leg assembly and an erected, operative position at the opposite end of the cross member. The ends of the leg assemblies opposite the cross member are connected to an apex frame which mounts a socket coupler component of a ball and socket type trailer hitch. Each leg assembly includes telescopic sections for adjusting the length of the leg assembly. A spring loaded locking piston in one leg section of each leg assembly is arranged, when the leg sections are extended, to project into a locking socket in the other leg section of the leg assembly, to secure the leg sections in extended condition. A spring loaded release plunger in the locking socket functions by finger pressure to retract the locking piston from the socket when it is desired to retract one leg section into the other. Flexible protective boots are provided about one of the telescoping leg sections of each leg assembly to protect the telescoping section against the deleterious effects of the surrounding environment and to contain lubricating grease and the like for constant lubrication of the telescoping leg sections.

8 Claims, 3 Drawing Sheets

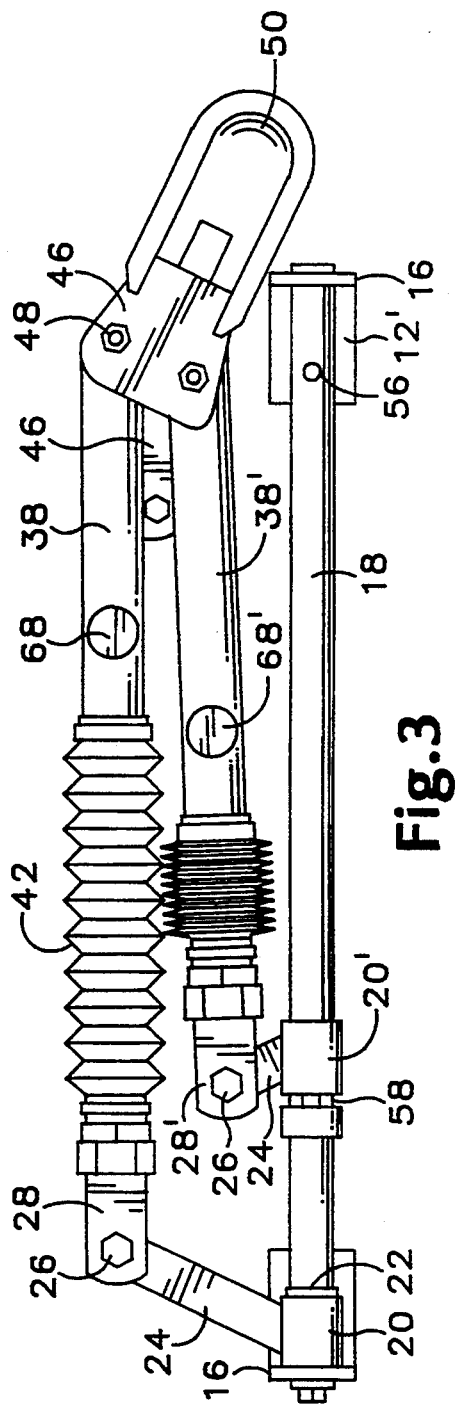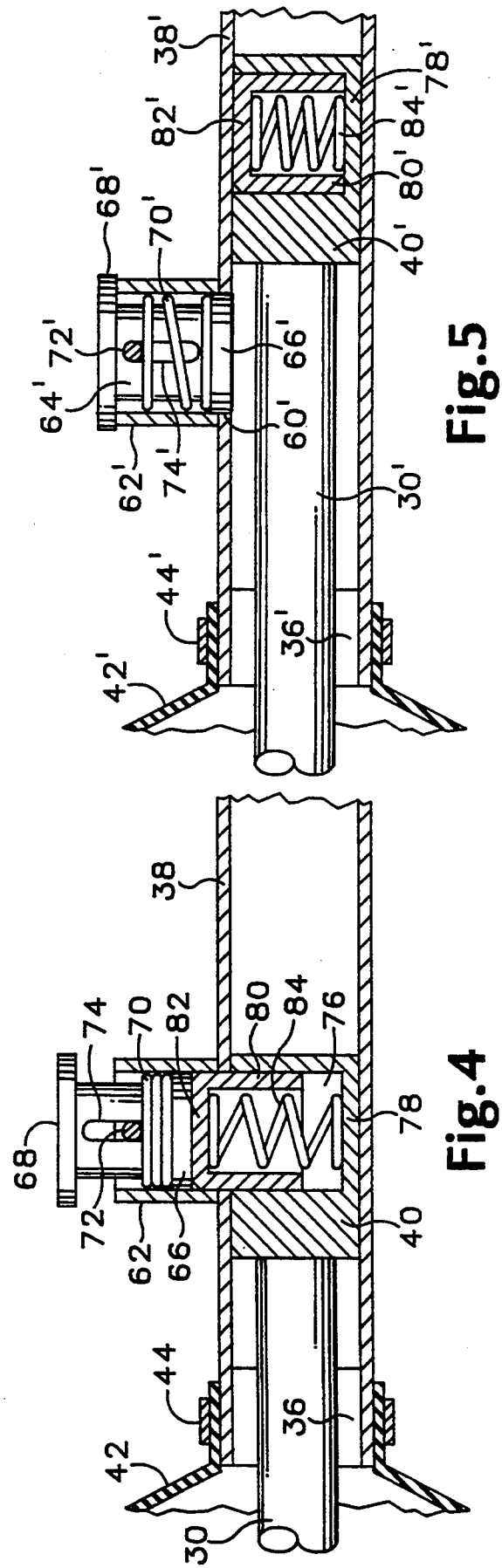

VEHICLE TOW BAR

BACKGROUND OF THE INVENTION

This invention relates to vehicle tow bars, and more particularly to a collapsible tow bar arranged for attachment to a vehicle which is to be towed.

More specifically, this invention represents and improvement over my earlier tow bar disclosed in U.S. Pat. No. 5,224,960 by the replacement of the locking mechanism with a more simplified and less costly locking mechanism.

SUMMARY OF THE INVENTION

This invention provides a pivotal, collapsible vehicle tow bar having a tubular cross member arranged to extend laterally across the front end of a vehicle to be towed, and a pair of telescoping legs one mounted pivotally at one end of the cross member and the other mounted pivotally on the cross member for movement along the length of the cross member, each leg having a pair of telescoping sections provided with releasably interengaging locking pin and socket members for releasably securing the telescoping sections in extended position.

It is the principal objective of this invention to provide a simplified locking mechanism for the tow bar of my earlier invention disclosed in U.S. Pat. No. 5,224,960.

Another objective of this invention is the provision of a vehicle tow bar of the class described which is of simplified construction for economical manufacture, maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 3 is a front elevation showing the tow bar in fully collapsed storage position.

FIG. 4 is a fragmentary sectional view, on an enlarged scale, taken on the line 4—4 in FIG. 2.

FIG. 5 is a fragmentary sectional view, on an enlarged scale, taken on the line 5—5 in FIG. 2.

DESCRIPTION OF THE PREFERRED EMBODIMENT

Figure 1:
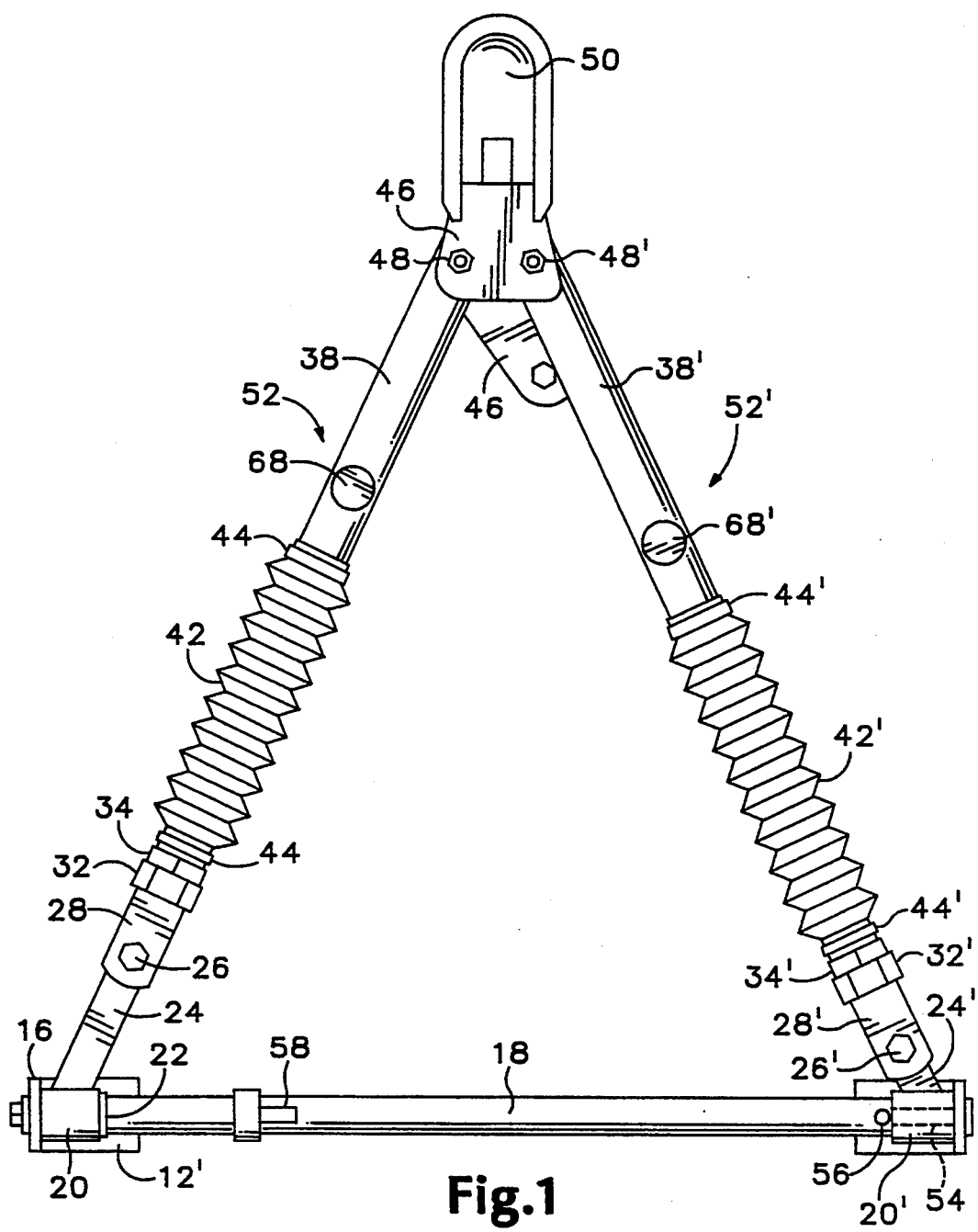
FIG. 1 is a front elevation of a tow bar embodying the features of this invention, the tow bar being shown swung upwardly from the horizontal, operative position in preparation for collapsing to storage position.

The tow bar 10 illustrated in the drawings is similar to the tow bar disclosed in my earlier patent, U.S. Pat. No. 5,224,960 aforesaid, except for the locking mechanism as previously mentioned. Thus, the tow bar is shown arranged for mounting on the front end of a vehicle to be towed, as by angle brackets 12. One leg 12' of each bracket is secured to the vehicle, as by the bolts.

The other leg 16 of each angle bracket extends longitudinally forward of the vehicle and secures between them a transverse cross member 18. The cross member is a hollow tube and is secured at its ends to reinforcing stub shafts welded or otherwise attached non-rotatably to the angle bracket legs 16.

Mounted rotatably on one end of the cross member 18 is a sleeve 20. The sleeve is retained against axial movement along the cross member by confinement between the angle bracket leg 16 and a collar 22 secured to the cross member. A bracket 24 is secured to and extends radially outward from the sleeve 20.

Secured pivotally to the outer end of the bracket 24, as by pivot pin 26, is an end member 28 configured to mount one end of an elongated rod 30. The end member 28 may comprise a hollow tube fixedly mounting a nut 32 on its end, the nut receiving the threaded end of the rod 30. A locking nut 34 may be provided on the threaded rod for tightening against the fixed nut 32 to frictionally secure the rod against undesired rotational movement relative to the nut 32. The opposite end of the rod 30 is captured slidably within a strengthened guide bearing 36 fixedly secured in the end of a hollow forward leg tube member 38. The terminal end of the rod 30 mounts an enlarged end guide member 40 configured for sliding movement within the hollow leg tube 38, as shown in FIGS. 4 and 5. Together, the guide sleeve 36 and the end guide member 40 provide guide means which assures non-binding, telescoping movement of the rod 30 and the hollow leg tube 38 relative to each other, and also provide extension limit means and locking means configured to secure the telescoping leg sections in operative, extended condition, as described hereinafter.

Accordingly, the forward leg tube member 38 and the rod 30 are slidable one relative to the other, in telescoping manner, and thus form a first elongated towing leg member of adjustable length having a rear, or inner, first telescoping leg section, and a forward, or outer, second telescoping leg section. A flexible, protective boot 42, such as the accordion configuration shown, is provided to enclose the rod 30 and is secured at its ends to the nut 34 and the forward tube 38, as by clamps 44. It will be understood that this protective boot, while allowing telescopic movement of the leg member, isolates the rod 30 from contamination by the outside environment, and hence keeps moisture, dirt and the like away from the rod, and as such prevents the accumulation of material that would affect the smooth sliding operation of the rod within the close tolerances provided by the strengthened sleeve 36. Also, the boot may be permanently filled with lubricating grease for the constant lubrication of the rod members and associated guide bearing members 36.

The forward terminal end of the telescoping tube leg member 38 is mounted to the apex frame 46 by a pivot pin 48. In the embodiment illustrated, the apex frame mounts, by any suitable connector means, the coupler component 50 of a conventional ball and socket-type trailer hitch. The ball component of the trailer hitch assembly is typically located on the towing vehicle (not shown).

The inner and outer telescoping leg sections 30 and 38, respectively, form a longitudinally telescoping, elongated leg member 52. A second longitudinally telescoping, elongated leg member is provided by the similar assembly of components 20', 24'-44', 48'. Accordingly, these components are identified by the same reference numerals but distinguished by a superscript.

Figure 2:
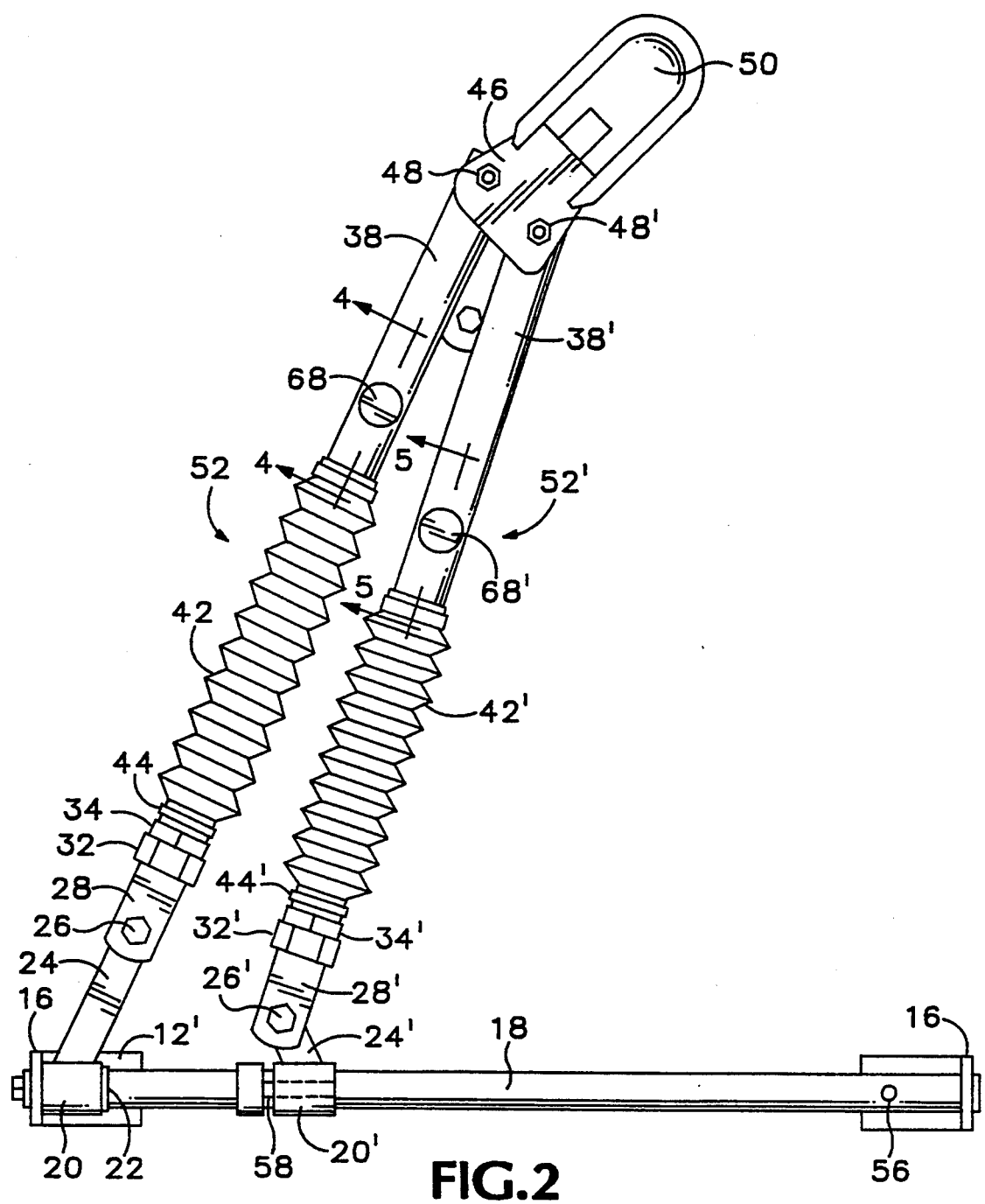
FIG. 2 is a front elevation similar to FIG. 1 showing the tow bar in an intermediate position of collapsing to storage position.

The second leg member 52' differs from the first described leg member 52 in the following respects: The sleeve 20' is not secured against axial movement along the cross member 18. Instead, such movement is accommodated by providing the sleeve 20' with an internal axially extending keyway 54. This keyway is located in such a manner that when the first and second elongated legs are disposed in the vertical plane illustrated in FIGS. 1, 2 and 3, the keyway is aligned with a confinement pin 56 secured to the cross member 18. In this position of alignment, the sleeve 20' may be moved to the left as in FIGS. 1 and 2. When the sleeve 20' reaches the leftwardmost position of FIG. 2, the keyway 54 has received a latch key 58 which is secured to the cross member 18. The key prevents rotation of the first and second leg assemblies about the axis of the cross member in the fully collapsed position of FIG. 4. When the assembly is in the horizontal towing position, the keyway is rotated out of alignment with the confinement pin 56, whereby the leg is prevented leftward movement axially along the cross member 18.

Also, bracket 24' is configured to be shorter in length than the corresponding bracket 24. The reason for this configuration is seen in FIG. 3, wherein the second telescoping leg assembly is shown underlying the first leg assembly when the tow bar is in fully collapsed, storage position. The shorter bracket 24' results in the disposing of the second leg assembly closer to the cross bar so that the first leg assembly may overlie the second leg assembly when pivoted to horizontal, as shown.

Lock means is provided on each leg assembly for securing the telescoping leg sections releasably in extended, towing position. In the embodiment illustrated and best shown in FIGS. 4 and 5, an opening 60 is provided through the wall of forward leg tube section 38. A hollow locking cylinder 62 encircles the opening 60 and is secured to the outer side of the tube section 38, as by welding. A plunger 64 is provided at its inner end with an annular projecting shoulder 66 slidably engaging the inner surface of the cylinder 62. A stop cap 68 on the outer end of the plunger is arranged to abut the outer end of the cylinder 62 to prevent the annular shoulder 66 from extending into the tube section 38. A coil spring 70 encircles the plunger 64 and abuts at one end against the shoulder 66. The opposite end of the coil spring abuts a stop pin 72 secured to and extending diametrically across the cylinder 62 and through an axially elongated slot 74 in the plunger 64. The coil spring thus urges the plunger axially inward to the position in which the cap 68 abuts the outer end of the cylinder 62.

The enlarged end guide member 40 is provided with a tranverse pocket 76 which is closed at its inner end by wall 78 and is open at the outer end to the inner surface of the tube section 38. A locking piston 80 is slidable within the pocket and is open at its inner end and closed at its outer end by wall 82. A coil spring 84 is contained within the piston and abuts at one end against the pocket wall 78 and at the other end against the piston wall 82. The coil spring thus urges the piston outwardly toward the inner surface of the tube section 38. The coil spring 84 resists compression to a greater extent than coil spring 70, for purposes described more fully hereinafter.

To allow inward telescoping of the tube sections 30, 38 from the fully extended and locked position of FIG. 4, finger pressure is applied to cap 68 to push the plunger 64 inwardly against the resilient resistance of coil spring 84. The locking piston 80 thereupon is moved inward into the pocket 76 until the outer surface of the piston wall 82 is even with the inner surface of the tube section 38. The tube section 30 then may be pushed into the tube section 38 to effect telescopic shortening of the leg 52.

When it is desired to effect full telescopic extension of the leg to the locked position of FIG. 4, the leg sections 30 and 38 are pulled apart until the locking piston 80 registers with the opening 60 in the leg section 38. Since the coil spring 84 is stronger than spring 70, the locking piston is pushed into the hollow locking cylinder 62 by pushing outwardly on the plunger 64 against the weaker resistance of coil spring 70. Outward movement of the locking piston 80 and plunger 64 is limited by compression of spring 70 against the stop pin 72. Since the piston extends partly into the locking cylinder 62 and partly into the pocket 76, the piston serves to lock the leg sections together against relative axial movement.

It is to be noted that leg sections 30 and 38 are secured against axial rotation by the connections 20 and 46, respectively, so that the locking piston 80 and opening 60 are maintained in alignment during telescopic extension and retraction of the leg sections. Such alignment also is maintained by providing leg section 38 in the form of square tubing, with guide member 40 also being in square cross section. Alternatively, leg section 38 may be circular in cross section and provided with an elongated key associated with a keyway formed in the guide member 40.

The hitching operation of coupling the tow bar to a towing vehicle is described in detail in my earlier U.S. Pat. No. 5,224,960 aforesaid. Release of the locking mechanism to allow telescoping movement of the legs 52 and 52' is achieved quickly and easily by the simple depression of the plunger cap 68. Similarly, full extension of the legs is achieved automatically by pulling outwardly on the leg sections 38 and 38', as by moving a towing vehicle forwardly and thereby pulling forwardly on the hitch coupler 50, until the locking piston 80 snaps into the hollow cylinder 62.

It will be apparent to those skilled in the art that various modifications and changes may be made in the size, shape, type, number and arrangement of parts described hereinbefore. Additionally, the structural arrangement of the telescopic leg assembly may be utilized for a wide variety of other purposes. These and other changes may be made without departing from the spirit of this invention and the scope of the appended claims.

I claim:

1. A telescopic leg assembly, comprising:
   a) first and second elongated leg members 52 and 52' each having an inner telescoping leg section 30, 30' movable telescopically within an outer telescoping leg section 38, 38' between telescopically extended and retracted positions,
   b) guide bearing means 36, 36' secured in the end of each outer telescoping leg section 38, 38' that telescopically receives the associated inner telescoping leg section 30,30' and configured to slidably receive therethrough the associated inner telescoping leg section 30,30',
   c) an enlarged end guide means 40,40' secured to the telescoping end of each inner telescoping leg section 30, 30' and configured to slidably engage the inner surface of the associated outer telescoping section 38, 38',
   d) a locking piston pocket 76, 76' in the enlarged end guide means 40, 40' of the associated inner telescoping leg section, e) a locking piston 80, 80' in said pocket,
f) a coil spring 84, 84' interengaging said locking piston pocket and locking piston for urging said locking piston in the direction laterally outward of said guide means 40, 40',
g) an opening 60, 60' in each outer leg section configured for reception of said locking piston when the inner and outer leg sections are in extended position,
h) a locking cylinder 62, 62' on the outer leg section surrounding said opening for receiving the locking piston therein,
i) a release plunger 64, 64' in the locking cylinder movable from a direction laterally inward to a direction laterally outward,
j) a coil spring 70, 70' interengaging said locking cylinder and release plunger for urging said release plunger in the direction laterally inward of said cylinder, and
k) stop means 72, 72' interengaging said locking cylinder and release plunger for limiting laterally outward movement of said plunger,
l) the release plunger being movable laterally inward to engage said locking piston and move said locking piston inwardly into the locking piston pocket to allow telescopic retraction of each of the inner and outer leg sections.

2. The telescopic leg assembly of claim 1 wherein the coil spring 84 interengaging the locking piston pocket 76 and locking piston 80 is stronger than the coil spring 70 interengaging the locking cylinder 62 and release plunger 64, whereby the release plunger is moved outwardly against the resistance of the associated coil spring 70 by the extension of the locking piston 80 into the locking cylinder.

3. The telescopic leg assembly of claim 1 including stop means 68, 68' on the plunger 64, 64' for preventing the release plunger from entering the outer telescopic leg section.

4. The telescopic leg assembly of claim 1 wherein the coil spring interengaging the locking piston pocket 76, 76' and locking piston 80, 80' is stronger than the coil spring 70, 70' interengaging the locking cylinder 62, 62' and release plunger 64, 64', whereby the release plunger is moved outwardly against the resistance of the associated coil spring by the extension of the locking piston into the locking cylinder, and stop means 68, 68' is provided on the release plunger for preventing the release plunger from entering the outer telescopic leg section 38, 38'.

5. A vehicle tow bar, comprising:
a) an elongated cross member 18 having a longitudinal axis,
b) a pair of mounting brackets 12 configured to be attached to laterally spaced positions at the front end of a vehicle to be towed,
c) first and second elongated telescoping leg members 52, 52' each having an inner telescoping leg section 30, 30' movable telescopically within an outer telescoping tubular leg section 38, 38' between telescopically extended and retracted positions,
d) sleeve means 20, 20' mounting one of the inner and outer telescoping leg sections 30, 30' and 38, 38' of the first and second leg members on cross member 18 for rotation about the longitudinal axis of the cross member, one of the sleeve means 20' being secured at one end of the cross member against axial movement along said cross member, the other sleeve means 20 being mounted on the cross member 18 for axial movement along the cross member for axial movement of the associated one of the leg members toward and away from the second leg member,
e) apex frame means 46 connecting the other of the inner and outer telescoping leg sections 38, 38' and 30, 30' of the first and second leg members together for connecting said leg members to a trailer hitch coupling,
f) first trailer hitch coupling means 50 configured for releasable connection to a companion second trailer hitch coupling means on a towing vehicle,
g) the first trailer hitch coupling means being connected to the apex frame means,
h) guide bearing means 36, 36' secured in the end of each outer telescoping leg section 38, 38' that telescopically receives the associated inner telescoping leg section 30, 30' and configured to slidably receive therethrough the associated inner telescoping leg section 30, 30',
i) an enlarged end guide means 40, 40' secured to the telescoping end of each inner telescoping leg section 30, 30' and configured to slidably engage the inner surface of the associated outer telescoping leg section 38, 38',
j) a locking piston pocket 76, 76' in the enlarged end guide means 40, 40' of each inner telescoping leg section,
k) a locking piston 80, 80' in said pocket,
l) a coil spring 84, 84' interengaging said locking piston pocket and locking piston for urging said piston in the direction laterally outward of said guide means 40, 40',
m) an opening 60, 60' in each outer leg section configured for reception of said locking piston when the inner and outer leg sections are in extended position,
n) a locking cylinder 62, 62' on each outer leg section surrounding said opening for receiving the locking piston therein,
o) a release plunger 64, 64' in the locking cylinder movable from a direction laterally inward to a direction laterally outward,
p) a coil spring 70, 70' interengaging said locking cylinder and release plunger for urging said release plunger in the direction laterally inward of said locking cylinder, and
q) stop means 72, 72' interengaging said locking cylinder and release plunger for limiting laterally outward movement of said release plunger,
r) the release plunger being movable laterally inward to engage said locking piston and move said locking piston inwardly into the locking piston pocket to allow telescopic retraction of each of the inner and outer leg sections.

6. The vehicle tow bar of claim 5 wherein the coil spring interengaging the locking piston pocket 76, 76' and locking piston 80, 80' is stronger than the coil spring 70, 70' interengaging the locking cylinder 62, 62' and release plunger 64, 64', whereby the release plunger is moved outwardly against the resistance of the associated coil spring by the extension of the locking piston into the locking cylinder.

7. The vehicle tow bar of claim 5 including stop means 68, 68' on the release plunger 64, 64' for preventing the release plunger from entering the outer telescopic leg section.

8. The vehicle tow bar of claim 5 wherein the coil spring interengaging the locking piston pocket 76, 76' and locking piston 80, 80' is stronger than the coil spring 70, 70' interengaging the locking cylinder 62, 62' and release plunger 64, 64', whereby the release plunger is moved outwardly against the resistance of the associated coil spring by the extension of the locking piston into the locking, cylinder, and stop means 68, 68' is provided on the release plunger for preventing the release plunger from entering the outer telescopic leg section 38, 38'.

* * * * *